US007664893B2

(12) United States Patent
Huang

(10) Patent No.: US 7,664,893 B2
(45) Date of Patent: Feb. 16, 2010

(54) MEDIA DRIVE CONTROL SYSTEM AND METHOD

(75) Inventor: King Huang, Taipei (TW)

(73) Assignee: Via Technologies Inc., Hsin-Tien, Taipei (TW)

( * ) Notice: Subject to any disclaimer, the term of this patent is extended or adjusted under 35 U.S.C. 154(b) by 960 days.

(21) Appl. No.: 11/025,266

(22) Filed: Dec. 29, 2004

(65) Prior Publication Data

US 2005/0248538 A1 Nov. 10, 2005

(30) Foreign Application Priority Data

Mar. 22, 2004 (TW) .............................. 93107636 A

(51) Int. Cl.
*G06F 13/00* (2006.01)
(52) U.S. Cl. .............................. 710/40; 710/39; 710/41; 710/52; 710/56; 710/2
(58) Field of Classification Search ................. 345/169, 345/522; 365/221, 240; 370/230; 710/52; 386/104
See application file for complete search history.

(56) References Cited

U.S. PATENT DOCUMENTS 6,323,867 B1 11/2001 Nookala et al.

| 6,370,323 | B1* | 4/2002 | Adolph et al. | ............... | 386/104 |
| 7,127,530 | B2* | 10/2006 | Ishimura et al. | ................ | 710/5 |
| 2002/0003845 | A1* | 1/2002 | Kamiya | ....................... | 375/340 |
| 2005/0034160 | A1* | 2/2005 | Kim et al. | ....................... | 725/80 |
| 2009/0210583 | A1* | 8/2009 | Bendyk et al. | ................. | 710/36 |

FOREIGN PATENT DOCUMENTS

CN 1348561 5/2002

OTHER PUBLICATIONS

Weiss, Data Structures and Problem Solving Using C++, 2000, Addison Weskey, pp. 541-547.*
CN Office Action mailed Jul. 13, 2007.

* cited by examiner

*Primary Examiner*—Henry W. H. Tsai
*Assistant Examiner*—Cheng-Yuan Tseng
(74) *Attorney, Agent, or Firm*—Thomas, Kayden, Horstemeyer & Risley

(57) ABSTRACT

Media drive control system and method. The media drive control system comprises a player console, a user operation filter, and a plurality of playback management devices. The player console provides an instant user operation (UOP) according to a received user command. The user operation filter comprises a queue and a management device. The queue receives and stores a plurality of UOPs, and outputs stored UOPs as control instructions on a first-in-first-out basis. The management device determines whether the queue is full. If the queue is full, the management device discards at least one of the stored UOPs prior to storing the instant UOP in the queue. Each playback management device receives control instructions for controlling corresponding playback devices.

5 Claims, 4 Drawing Sheets

MEDIA DRIVE CONTROL SYSTEM AND METHOD

BACKGROUND OF THE INVENTION

1. Field of the Invention

The present invention relates to a media drive control system and method, and more particularly to player command control according to a user operation filter.

2. Description of the Related Art

Generally, in a control system of a media drive such as a Digital Video Disc (DVD) player, a control procedure manages a plurality of user commands related to disc play. A player console 401 as shown in FIG. 4 receives user commands corresponding to user operations (UOPs) such as play, stop, pause, reverse, fast-forward, and the like, and transmits the UOPs to corresponding playback management devices 403~405. The playback management devices 403~405 have queues 4031~4051 receiving and storing UOPs on a first-in-first-out (FIFO) basis, for controlling the media drive according to the UOPs.

Each UOP requires a period of time to execute, hence, if one of the playback management devices 403~405 receives a plurality of UOPs, the UOPs to be executed are stored sequentially in corresponding queues 4031~4051. If an excessive number of UOPs are received and stored at the same time, the queues 4031~4051 reach capacity, and UOPs received thereafter are discarded. This may occur, for example, after an excessive unexpected operations are submitted to the playback management device 403. Thus, a termination instruction provided to the playback management device 403 but is discarded because the queue 1031 is full, results in invalid termination instruction.

Additionally, in the conventional media drive control system, user commands are still provided to the playback management device 404 or 405 while the playback management device 403 is executing UOPs, resulting in errors, system instability, or other malfunctions.

SUMMARY OF THE INVENTION

The object of the present invention is to provide a media drive control system, comprising a plurality of playback management devices and a user playback filter with a queue, thus eliminating the need for queues in the individual playback control devices. The user playback filter is capable of receiving and storing a plurality of UOPs in its own queue, thus preventing user and system operations from occurring simultaneously.

Additionally, the media drive control system of the present invention is capable of prioritizing execution of stored UOPs, thereby preventing important UOPs from being discarded even if the queue overflows.

Accordingly, the present invention provides a media drive control system comprising a software based player console, a user operation filter, and a plurality of playback management devices. The software based player console provides an instant UOP when receiving a user command. The user operation filter comprises a queue and a management device. The queue prioritizes UOPs on a FIFO basis, wherein the UOPs are received and stored. The queue further outputs stored UOPs as control instructions. The management device determines whether the queue is full. If the queue is full, the management device discards at least one of the stored UOPs prior to storing the instant UOP in the queue. Each of the playback management devices receives the control instructions to control corresponding playback device accordingly.

According to the object of the present invention, the management device determines whether the instant UOP meets a predetermined condition. If the instant UOP meets the predetermined condition, the management device stores and prioritizes the instant UOP as first among the UOPs to be output.

In another aspect of the invention, the management device empties the queue and stores the instant UOP therein.

Furthermore, the present invention provides a method for controlling a media drive control system. The system, initially, receives an instant UOP from a player console and determines whether a queue is full. If the queue is full, it discards at least one of a plurality of stored UOPs and stores the instant UOP in the queue. Finally, the stored commands are sequentially output as control instructions to control a plurality of corresponding playback devices.

The control method of the present invention is capable of determining whether the instant UOP is a particular playback instruction. If the UOP is the particular playback instruction, the instant UOP is stored in the queue and prioritized as the first among the stored commands to be output.

If the particular playback instruction is a termination instruction, the control method further comprises the following steps of emptying the queue, storing the particular playback instruction in the queue, and outputting the particular playback instruction to the corresponding playback device.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The object of the present invention is to provide a media drive control system, comprising a plurality of playback management devices and a user playback filter with a queue, thus eliminating the need for queues in the individual playback control devices. The user playback filter is capable of receiving and storing a plurality of UOPs in its own queue, thus preventing user and system operations from occurring simultaneously.

Figure 1:
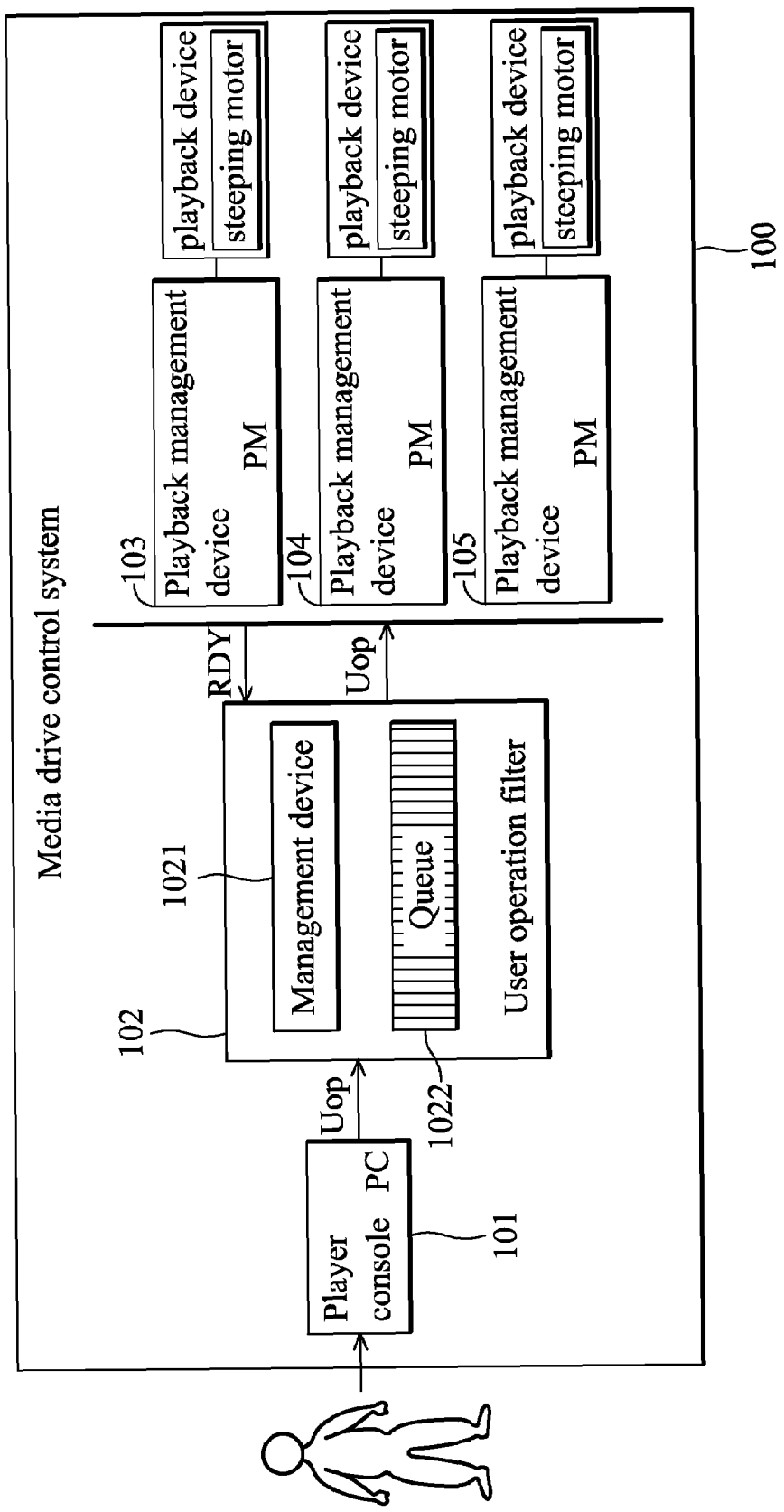
FIG. 1 is a schematic diagram of a media drive control system 100 of the present invention.

FIG. 1 is a schematic diagram of a media drive control system 100 of the present invention. The media drive control system 100 comprises a player console 101, a user operation filter 102, and a plurality of playback management devices 103~105. The player console 101 provides an instant UOP according to a received user command. The user operation filter 102 stores and filters a plurality of UOPs. The playback management devices 103~105 are capable of controlling corresponding playback devices according to UOPs provided by the user operation filter. The playback devices may comprise steeping motors.

Additionally, the user operation filter 102 comprises a management device 1021 and a queue 1022. The management device 1021 controls UOPs accessing the player console 101 and the playback management device 103~105. The user operation filter 102 controls the operational procedure of the UOPs, to ensure that only one UOP is executed at a time, and that important UOPs have first priority for execution.

Figure 2:
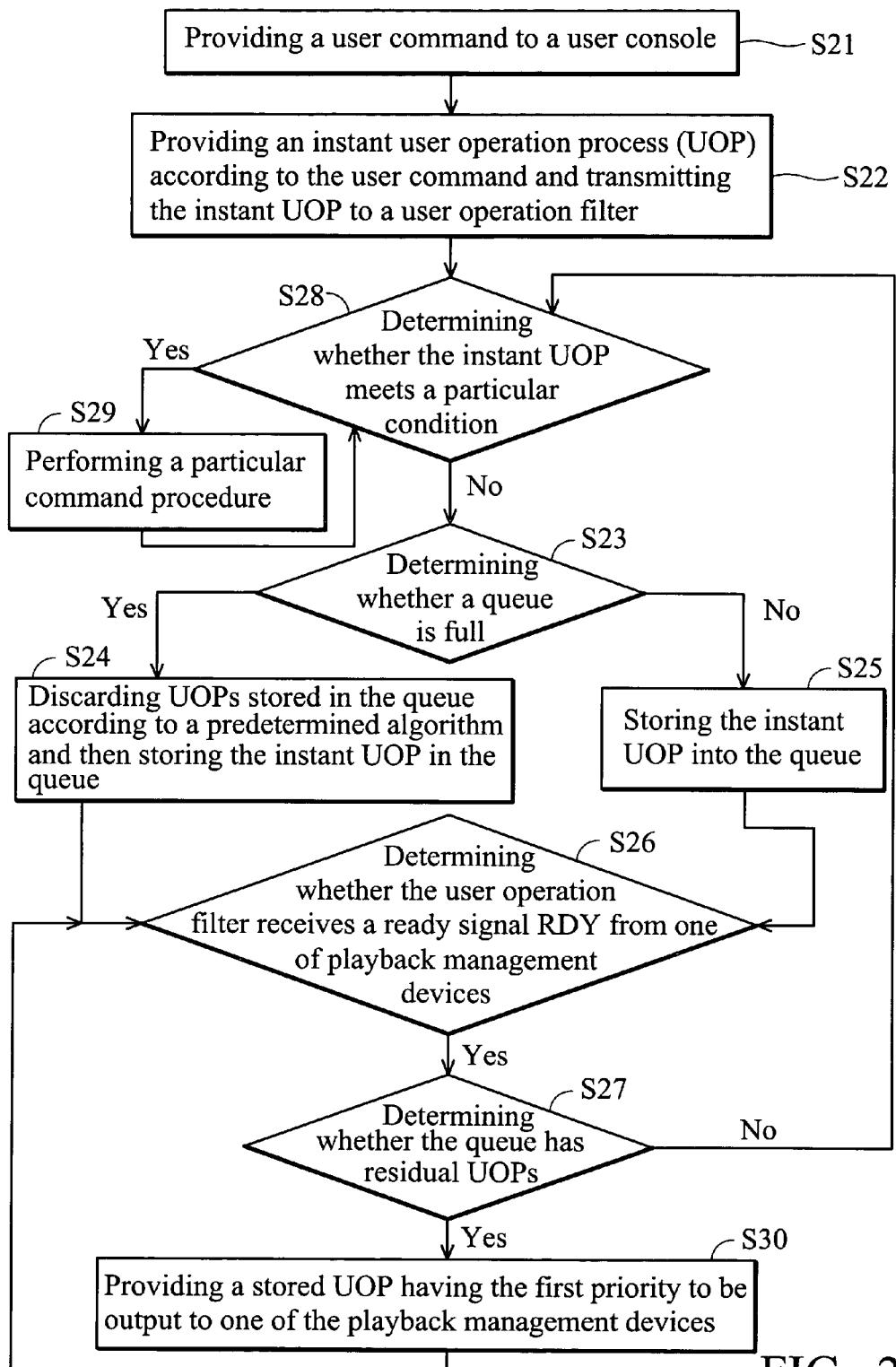
FIG. 2 is a flowchart showing processing of a user operation.

FIG. 2 is a flowchart showing processing of a user operation. In step S21, a user command is input via the player console 101. In step S22 an instant user operation (UOP) is provided to the user operation filter 102 via the player console 101. In step S28, the management device 1021 determines whether the instant UOP meets a particular condition when the user operation filter 102 receives the instant UOP.

If the result of step S28 is positive, step S29 follows and performs a particular command process, and then returns to step S28. Conversely, if the result of step S28 is negative, step S23 follows and determines whether the queue 1022 is full. If the queue 1022 is full, step S24 follows and discards the UOPs stored in the queue 1022 according to a predetermined algorithm and then stores the instant UOP in the queue 1022. If the queue 1022 is not full, step S25 follows and directly stores the instant UOP in the queue 1022.

Step S26 follows and determines whether the user operation filter 102 receives a ready signal RDY from one of the playback management devices 103~105. Each of the playback management devices 103~105 provides the ready signal RDY after completing one of the UOPs informing the user operation filter 102 to provide a next UOP. If the user operation filter 102 receives the ready signal RDY, step S27 follows and determines whether any UOPs remain in the queue 1022.

If no UOPs remain in the queue, step S28 follows and waits for the next UOP to be input to the user operation filter 102. If not, step S30 follows and provides a stored UOP having the first priority to be output to one of the playback management devices 103~105, and then proceeds to step S26, to wait for the next ready signal RDY. Accordingly, only one of the stored UOPs is executed at a time, thus preventing two commands from executing simultaneously and eliminating attendant problems in playback management devices 103~105.

Figure 3:
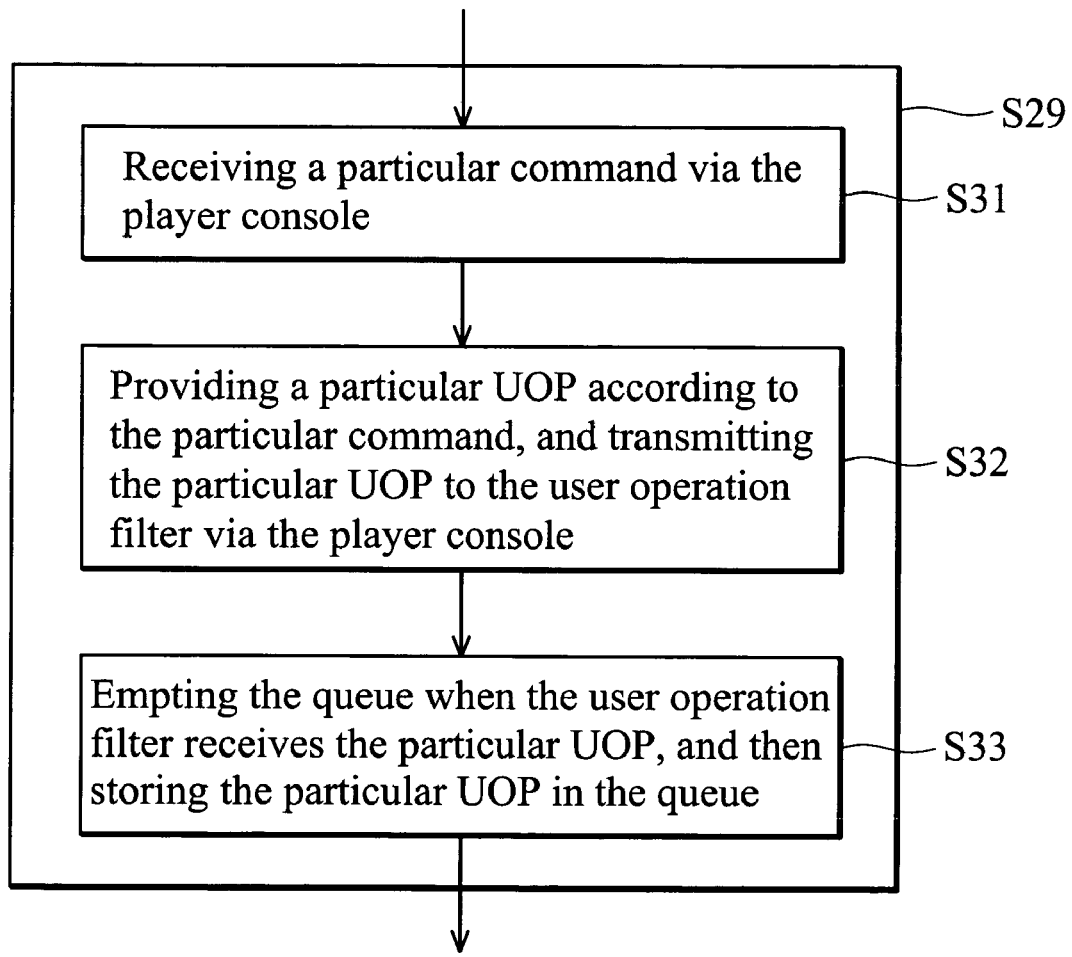
FIG. 3 is a flowchart of step 29 of FIG. 2.
Figure 4:
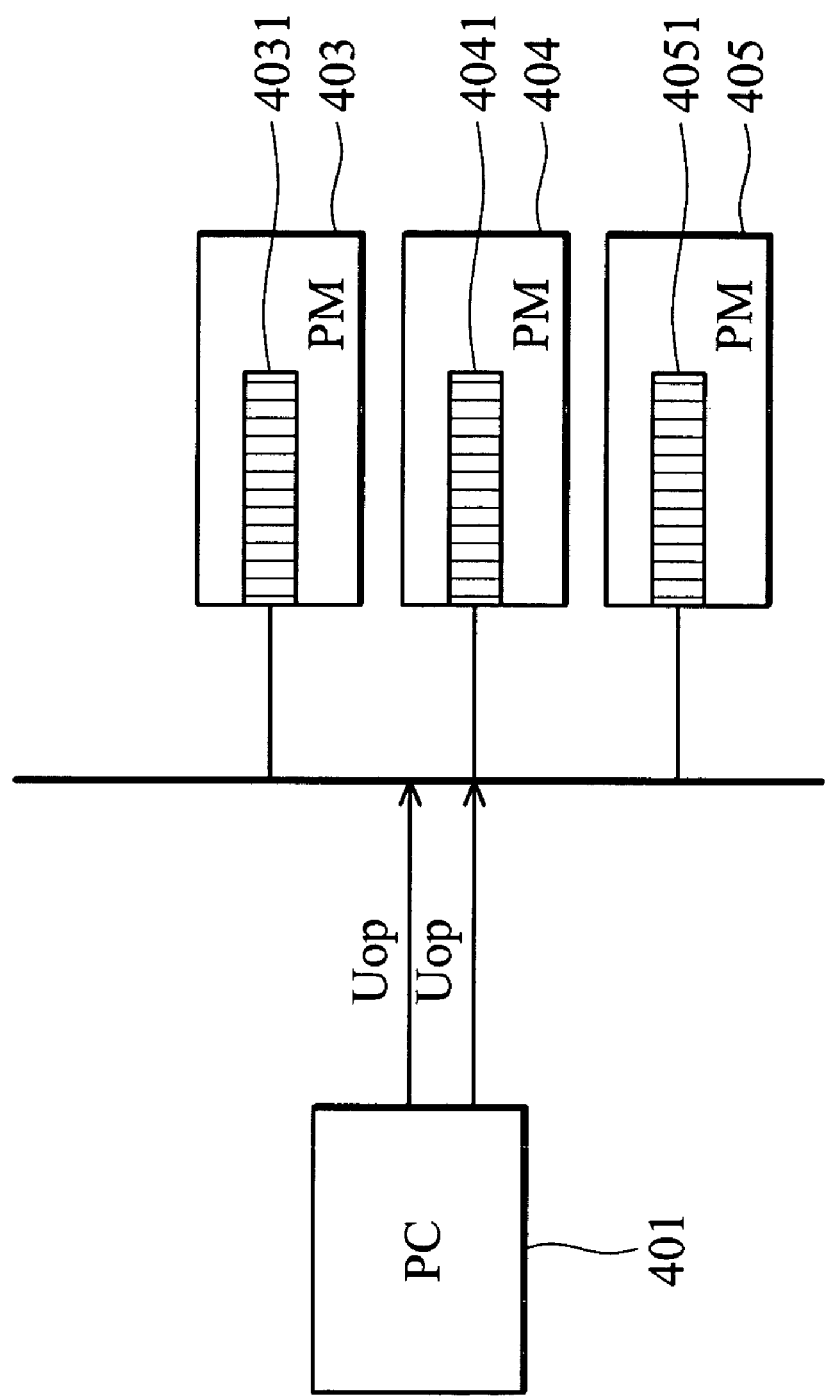
FIG. 4 is a conventional schematic diagram of a media drive control system.

FIG. 3 is a flowchart of step 29 of FIG. 2. In step S31 a particular command is provided to the player console. Step 32 follows and provides a particular UOP according to the particular command, and transmits the particular UOP to the user operation filter 102 via the player console 101. Step S33 follows and empties the queue 1022 when the user operation filter 102 receives the particular UOP, and then stores the particular UOP in the queue 1022. Thus, the user operation filter 102 provides only the particular UOP stored in the queue 1022 to one of the playback management devices 103~105 when the next ready signal RDY is received.

For example, if the player console 101 further provides the particular UOP or termination instruction to the user operation filter 102 after providing an excessive number of unexpected UOPs, the user operation filter 102 empties the queue 1022 to free capacity and then stores the termination instruction in the queue 1022. Thus, the user operation filter 102 outputs only the termination instruction to the playback management device 103 when the ready signal RDY is received from the playback management device 103, thereby enabling execution thereof by the corresponding device.

Accordingly, the user is able to terminate operation of the media drive control system before an unexpected problem occurs and stored coming UOPs queued to execute thereafter are deleted.

Therefore, the media drive control system 100 of the present invention is capable of executing a particular UOP even if the queue 1022 is full, thus preventing operational problems in the media drive control system 100.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A media drive control system, comprising:
a plurality of playback management devices, each coupled to a corresponding playback device; and
a user operation filter, comprising:
    a queue, receiving, storing and outputting a plurality of user operations UOPs as control instructions including at least a termination instruction as a predetermined condition, on a first-in-first-out basis; and
    a management device:
    1) prioritizing the received termination instruction to be the first among the stored UOPs for outputting to the corresponding playback management device by emptying the queue as a predetermined condition is determined,
    2) discarding at least one of the stored UOPs to free the queue capacity for storing the received UOP into the queue if the queue is full; and
    3) receiving a ready signal from one of the playback management devices and thereby transmitting a stored UOP having the first priority to the corresponding playback management device if the queue is not empty;
wherein the plurality of playback management devices receive the stored UOPs as control instructions from the management device of the user operation filter to accordingly control corresponding playback devices, and provide a next ready signal to inform the user operation filter to provide a next control instruction after completing the present control instructions.

2. A control method for a media drive control system, comprising steps of:
receiving an instant UOP from a player console;
determining whether the instant UOP is a particular playback instruction including a termination instruction for at least one of a plurality of playback devices, storing the instant UOP in a queue, and prioritizing the instant UOP in the queue as first among the stored UOPs to be output to a corresponding of a plurality of playback management device by emptying the queue if the UOP is the particular playback instruction;
determining whether the queue is full;
discarding at least one of a plurality of UOPs stored in the queue to free capacity for storing the instant UOP if the queue is full;
determining whether the queue is empty when receiving a ready signal from one of the plurality of playback management devices, wherein the ready signal is provided after one of the playback management devices has completed one of the control instructions; and
if the queue is not empty, outputting the stored UOP having first priority as a control instruction to control the corresponding playback management device.

3. The media drive control system of claim 1, wherein the playback devices comprise stepping motors.

4. The control method of claim 2, wherein the playback devices comprise stepping motors.

5. The media drive control system of claim 1, further comprises a player console, providing the user operation UOP to the user operation filter in response to receiving a user command at the player console.

* * * * *